US010393078B2

(12) United States Patent
Takayama et al.

(10) Patent No.: US 10,393,078 B2
(45) Date of Patent: Aug. 27, 2019

(54) FUEL SUPPLY DEVICE

(71) Applicant: DENSO CORPORATION, Kariya, Aichi-pref. (JP)

(72) Inventors: Yoshishige Takayama, Kariya (JP); Toshihiko Muramatsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 139 days.

(21) Appl. No.: 15/551,667

(22) PCT Filed: Mar. 25, 2016

(86) PCT No.: PCT/JP2016/001749
§ 371 (c)(1),
(2) Date: Aug. 17, 2017

(87) PCT Pub. No.: WO2016/170732
PCT Pub. Date: Oct. 27, 2016

(65) Prior Publication Data
US 2018/0038327 A1    Feb. 8, 2018

(30) Foreign Application Priority Data

Apr. 23, 2015    (JP) .................................. 2015-088576

(51) Int. Cl.
*F02M 37/10*    (2006.01)
*F02M 37/44*    (2019.01)
(Continued)

(52) U.S. Cl.
CPC ........... *F02M 37/103* (2013.01); *B32B 27/08* (2013.01); *F02M 37/0082* (2013.01); *F02M 37/10* (2013.01); *F02M 37/44* (2019.01)

(58) Field of Classification Search
CPC ........... F02M 37/0076; F02M 37/0082; F02M 37/04; F02M 37/08; F02M 37/103; F02M 2037/082; F02M 2037/085; B32B 27/08
See application file for complete search history.

(56) References Cited

U.S. PATENT DOCUMENTS 7,255,092 B2 *    8/2007    Milton .................. B32B 3/02
                                                       123/468
2006/0115370 A1 *    6/2006    Milton .................. B32B 3/02
                                                       417/572
(Continued)

FOREIGN PATENT DOCUMENTS

JP    2002-144891    5/2002
JP    2011-157848    8/2011

OTHER PUBLICATIONS

International Search Report for PCT/JP2016/001749, dated May 31, 2016, 4 pages.
(Continued)

*Primary Examiner* — Erick R Solis
*Assistant Examiner* — Anthony L Bacon
(74) *Attorney, Agent, or Firm* — Nixon & Vanderhye PC (57) ABSTRACT

A tank lid includes: a lid main body that covers an opening portion of a fuel tank; a metal terminal that is for electrical driving and penetrates through the lid main body between an inside and an outside of the fuel tank; a connector that includes an outer tubular portion, which projects from a lid front surface to the outside of the fuel tank, while a bottomed tubular inner surface of the outer tubular portion surrounds the metal terminal; and a resin coating film that is acid resistant and is dielectric. The resin coating film is formed by dry coating through chemical vapor deposition on: an outer exposed surface of the outer tubular portion, which includes the bottomed tubular inner surface of the outer tubular portion as a surface exposed to the outside of the fuel tank; and the lid front surface.

7 Claims, 10 Drawing Sheets

(51) Int. Cl.
  *B32B 27/08*   (2006.01)
  *F02M 37/00*   (2006.01)

(56) References Cited

U.S. PATENT DOCUMENTS

| | | | | |
|---|---|---|---|---|
| 2007/0044772 | A1* | 3/2007 | Sakamoto | F02M 37/10 |
| | | | | 123/509 |
| 2008/0184970 | A1* | 8/2008 | Igarashi | F02M 37/103 |
| | | | | 123/509 |
| 2009/0001331 | A1 | 1/2009 | Konishi et al. | |
| 2011/0192381 | A1* | 8/2011 | Maruyama | F02M 37/08 |
| | | | | 123/497 |
| 2012/0060948 | A1* | 3/2012 | Okazono | F02M 37/0017 |
| | | | | 137/565.17 |
| 2015/0219513 | A1* | 8/2015 | Uematsu | G01L 19/0084 |
| | | | | 73/754 |
| 2017/0241385 | A1* | 8/2017 | Takayama | F02M 37/10 |

OTHER PUBLICATIONS

Written Opinion of the ISA for PCT/JP2016/001749, dated May 31, 2016, 5 pages.

\* cited by examiner

FUEL SUPPLY DEVICE

CROSS REFERENCE TO RELATED APPLICATION

This application is the U.S. national phase of International Application No. PCT/JP2016/001749 filed Mar. 25, 2016, which designated the U.S. and is based on and incorporates herein by reference Japanese Patent Application No. 2015-88576 filed on Apr. 23, 2015.

TECHNICAL FIELD

The present disclosure relates to a fuel supply device that is electrically driven to supply fuel from an inside of a fuel tank toward an outside of the fuel tank.

BACKGROUND ART

A fuel supply device, which includes a tank lid fixed to a fuel tank, has been widely used.

In one such fuel supply device disclosed in the patent literature 1, an opening portion of the fuel tank is closed with the tank lid such that a lid front surface of the tank lid is exposed to the outside of the fuel tank. The lid front surface of the tank lid is made of resin that is acid resistant, so that durability of the tank lid is improved.

However, in the fuel supply device disclosed in the patent literature 1, the acid resistant resin is layered over the base resin through double-shot molding to form the tank lid. In the case of this type of manufacturing method of the tank lid, when the structure of the tank lid is complicated due to, for example, a projection of a connector that surrounds metal terminals, a primary molded product may be easily damaged at the time of secondary molding, or there may be an unavoidable incidence of that a portion of the tank lid cannot be formed as a secondary product. Furthermore, particularly, in the case where the primary molded product can be easily damaged, it is difficult to manage the injection pressure control and the contraction pressure control of the resin at the time of secondary molding. Therefore, the productivity of the tank lid is disadvantageously deteriorated.

In view of the above disadvantage, the inventors of the present application have studied a technique that improves not only the durability of the tank lid but also the productivity of the tank lid by coating of an acid resistant film on at least the lid front surface of the tank lid. As a result of the study, the following need is found. That is, in a case where the tank lid includes the connector that has the bottomed tubular inner surface, which surrounds the metal terminals, it is required to form a resin coating film, which is acid resistant against an acidic liquid located at the outside of the fuel tank and is dielectric, on the connector while film thickness variations of the resin coating film is kept to be small. This is due to the following reason. That is, for example, in a case where the resin coating film is formed by an ordinary spray coating technique, due to a surface tension of a liquid paint and blowback of the liquid paint at the time of spraying the liquid paint, the film thickness of the resin coating film is reduced at an inner corner portion of the bottomed tubular inner surface of the connector and an outer corner portion of an outer peripheral surface of the connector in comparison to the rest of the connector, so that the acid resistance and the dielectricity of the resin coating film are deteriorated at the inner corner portion of the bottomed tubular inner surface of the connector and the outer corner portion of the outer peripheral surface of the connector.

CITATION LIST

Patent Literature

PATENT LITERATURE 1: U.S. Pat. No. 7,255,092B2

SUMMARY OF INVENTION

The present disclosure is made in view of the above disadvantages, and it is an objective of the present disclosure to provide a fuel supply device that ensures acid resistance and dielectricity at a tank lid having a connector at a high productivity.

In order to achieve the above objective, according to a first aspect of the present disclosure, there is provided a fuel supply device including a tank lid to be fixed to a fuel tank, wherein the fuel supply device is driven through electrical driving of the fuel supply device to supply fuel from an inside of the fuel tank toward an outside of the fuel tank, wherein the tank lid includes:
  a lid main body that covers an opening portion of the fuel tank such that a lid front surface of the lid main body is exposed to the outside of the fuel tank;
  a metal terminal that is for the electrical driving and penetrates through the lid main body between the inside and the outside of the fuel tank;
  a connector that includes an outer tubular portion, which projects from the lid front surface to the outside of the fuel tank, wherein a bottomed tubular inner surface of the outer tubular portion surrounds the metal terminal; and
  a resin coating film that is acid resistant and is dielectric, wherein the resin coating film is formed by dry coating through chemical vapor deposition at:
    an outer exposed surface of the outer tubular portion, which includes the bottomed tubular inner surface of the outer tubular portion as a surface exposed to the outside of the fuel tank; and
    the lid front surface.

According to the first aspect of the present disclosure, the metal terminal, which is for the electrical driving and penetrates through the lid main body of the tank lid, is surrounded by the bottomed tubular inner surface of the outer tubular portion that projects from the lid front surface of the connector to the outside of the fuel tank. The resin coating film is formed at the side where the outside of the fuel tank is located by the dry coating of the outer exposed surface of the outer tubular portion, which includes the bottomed tubular inner surface of the outer tubular portion, as the surface of the outer tubular portion exposed to the outside of the fuel tank, and the lid front surface through the chemical vapor deposition. The dry coating, which is made through the chemical vapor deposition, can form the resin coating film at the high productivity even in the case of the tank lid that includes the connector and has the complicated structure. Additionally, the dry coating through the chemical vapor deposition can form the resin coating film at an inner corner portion of the bottomed tubular inner surface and an outer corner portion of an outer peripheral surface of the outer tubular portion of the connector without having the influence of the surface tension. In this way, the film thickness variations of the resin coating film can be limited at the side where the outside of the fuel tank is located.

Therefore, it is possible to ensure the acid resistance and the dielectricity of the tank lid having the connector.

Furthermore, according to a second aspect of the present disclosure, the lid main body covers the opening portion such that a lid back surface of the lid main body is exposed in the inside of the fuel tank;

the connector includes an inner tubular portion, which projects from the lid back surface into the inside of the fuel tank, wherein a bottomed tubular inner surface of the inner tubular portion surrounds the metal terminal; and the resin coating film is formed by the dry coating through the chemical vapor deposition at:

an inner exposed surface of the inner tubular portion, which includes the bottomed tubular inner surface of the inner tubular portion as a surface exposed to the inside of the fuel tank; and the lid back surface.

According to the second aspect of the present disclosure, the metal terminal, which penetrates through the lid main body of the tank lid, is also surrounded by the bottomed tubular inner surface of the inner tubular portion, which projects from the lid back surface of the connector into the inside of the fuel tank. The resin coating film is also formed at the side where the inside of the fuel tank is located by the dry coating of the inner exposed surface of the inner tubular portion, which includes the bottomed tubular inner surface of the inner tubular portion, as the surface of the inner tubular portion exposed to the inside of the fuel tank, and the lid back surface through the chemical vapor deposition. The dry coating through the chemical vapor deposition can form the resin coating film at the inner corner portion of the bottomed tubular inner surface and the outer corner portion of the outer peripheral surface of the inner tubular portion of the connector without having the influence of the surface tension. Accordingly, it is possible to limit the film thickness variations of the resin coating film even at the side where the inside of the fuel tank is located. Therefore, it is possible to ensure the acid resistance and the dielectricity of the entire tank lid that has the connector.

DESCRIPTION OF EMBODIMENTS

An embodiment of the present disclosure will be described with reference to the accompanying drawings.

Figure 1:
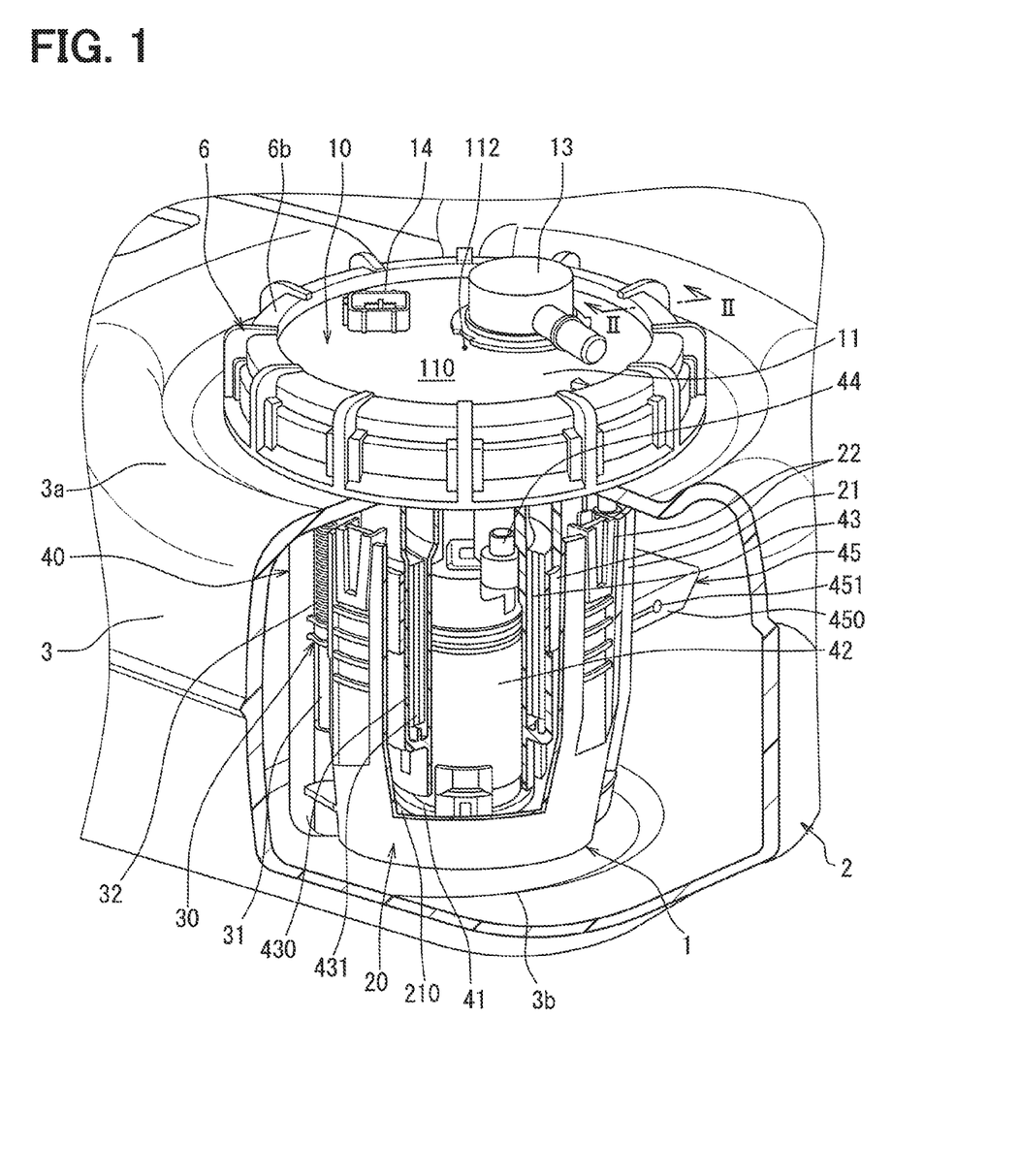
FIG. 1 is a partially fragmented perspective view showing a fuel supply device according to an embodiment of the present disclosure.

As shown in FIG. 1, a fuel supply device 1 according to the embodiment of the present disclosure is installed to a fuel tank 2 of a vehicle. The fuel supply device 1 supplies fuel from an inside of the fuel tank 2 to an internal combustion engine located at an outside of the fuel tank 2 in the vehicle. The internal combustion engine, which serves as a fuel supply destination supplied with the fuel from the fuel supply device 1, may be a gasoline engine or a diesel engine.

Figure 2:
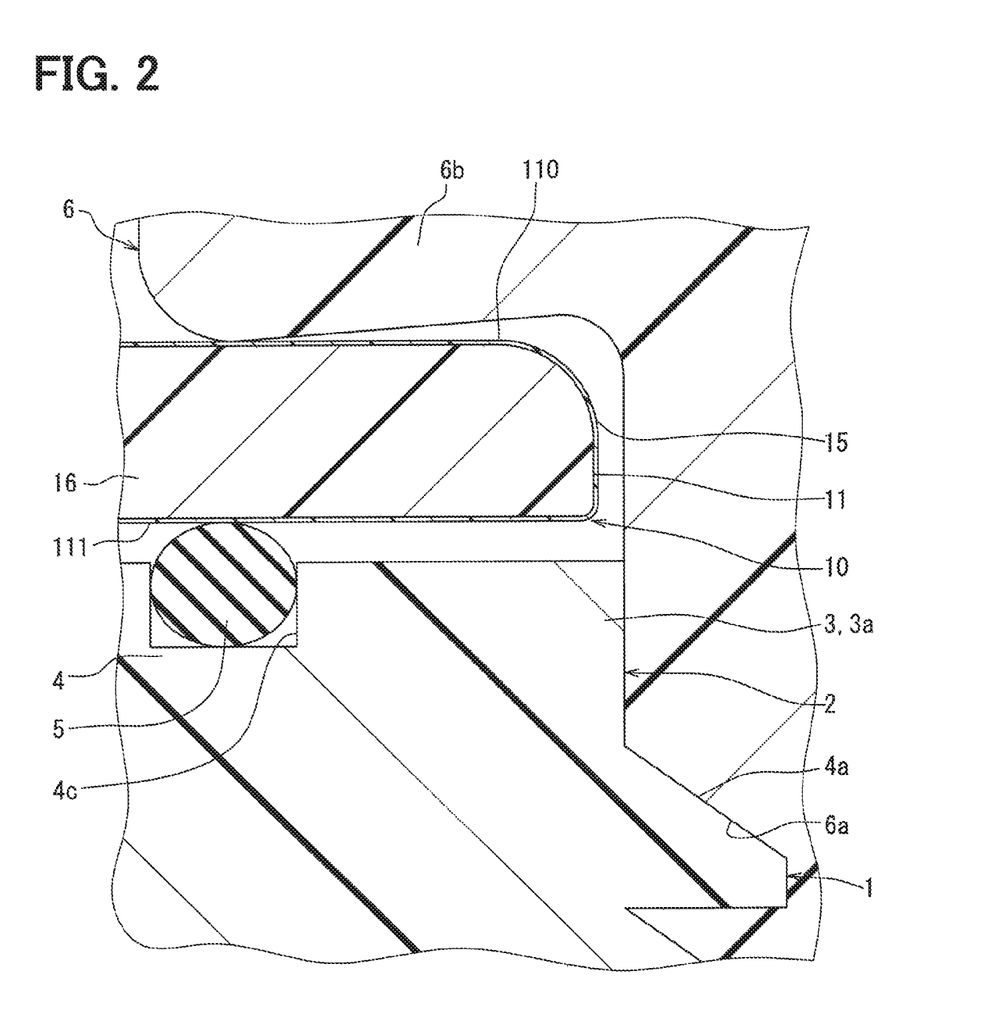
FIG. 2 is a cross-sectional view taken along line II-II in FIG. 1.
Figure 5:
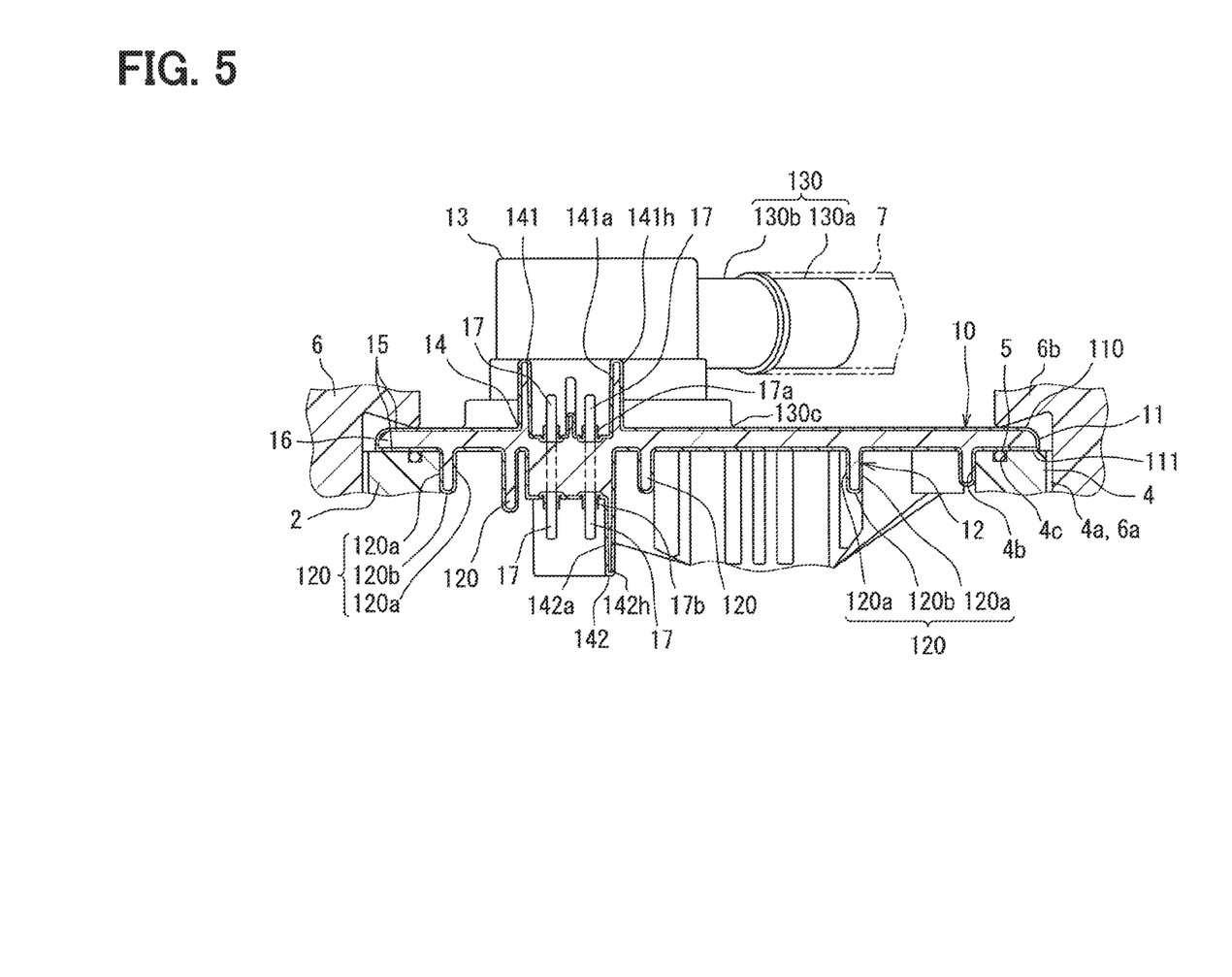
FIG. 5 is a cross-sectional view taken along line V-V in FIG. 3.

With reference to FIGS. 1 and 2, the fuel tank 2, to which the fuel supply device 1 is installed, is made of a resin material or a metal material and is shaped into a hollow form, and thereby the fuel tank 2 stores the fuel to be supplied to the internal combustion engine. Here, a ceiling wall 3a, which is a portion of a tank wall 3 of the fuel tank 2 and is located on an upper side of the fuel, has a fixation seat section 4, which is shaped into a cylindrical tubular form, as shown in FIGS. 2 and 5. A tank-side threaded engaging portion 4a, which is in a form of a male thread, is formed at an outer peripheral surface of the fixation seat section 4. An inner peripheral surface of the fixation seat section 4 forms an opening portion 4b that penetrates through the fixation seat section 4 in a top-to-bottom direction. A holding recess 4c, which is shaped into a circular ring form, is formed at an upper surface of the fixation seat section 4 such that the holding recess 4c is coaxial with the tank-side threaded engaging portion 4a and the opening portion 4b. A resilient member 5, which is made of a rubber material and is shaped into a circular ring form, is held in an inside of the holding recess 4c.

The fuel supply device 1 is fixed to the fuel tank 2 by a fixation member 6 shown in FIGS. 1 and 2. The fixation member 6 is made of a resin material or a metal material and is shaped into a cylindrical tubular form. As shown in FIGS. 2 and 5, a fixation-side threaded engaging portion 6a, which is threadably engaged with the tank-side threaded engaging portion 4a in a coaxial manner, is formed at an inner peripheral surface of the fixation member 6. An inner flange 6b, which is shaped into a circular ring plate form, is formed at an upper surface of the fixation member 6.

(Basic Structure)

A basic structure of the fuel supply device 1 will be described. As shown in FIG. 1, the fuel supply device 1 includes a tank lid 10, a sub-tank 20, an adjusting mechanism 30 and a pump unit 40. The elements 20, 30, 40 of the fuel supply device 1, which are other than the tank lid 10, are received in the inside of the fuel tank 2.

As shown in FIGS. 1-5, the tank lid 10 includes a lid main body 11, a rib structure 12, a fuel supply tube 13, a connector 14 and metal terminals 17. The lid main body 11 is made of a resin material and is shaped into a circular disk form. As shown in FIGS. 1, 2 and 5, the lid main body 11 is interposed between the fixation seat section 4 and the inner flange 6b. In the present embodiment, when the fixation-side threaded engaging portion 6a is threadably engaged with the tank-side threaded engaging portion 4a, the lid main body 11 is fixed to the fixation seat section 4 to entirely close the opening portion 4b from the upper side of the opening portion 4b. In this way, at the lid main body 11, a majority of a lid front surface 110, which is an upper surface of the lid main body 11, is exposed to the outside of the fuel tank 2, and a majority of a lid back surface 111, which is a lower surface of the lid main body 11, is exposed to the inside of the fuel tank 2. Furthermore, in the state where the lid front surface 110 tightly contacts the inner flange 6b, the lid back surface 111 is urged against the resilient member 5 on a side that is opposite from the inner flange 6b, so that a gap between the lid main body 11 and the fixation seat section 4 is sealed.

As shown in FIG. 5, the rib structure 12 includes a plurality of reinforcement ribs 120. The reinforcement ribs 120 are respectively made of a resin material and are respectively shaped into a plate form such that the reinforcement ribs 120 are formed in one-piece with the lid main body 11. The reinforcement ribs 120 respectively project from the lid back surface 111 into the inside of the fuel tank 2 located on the lower side of the lid back surface 111, so that the reinforcement ribs 120 reinforce the lid main body 11. Opposed plate surfaces 120a, which are opposed to each other, and a projecting end surface 120b of each of the reinforcement ribs 120 are exposed in the inside of the fuel tank 2.

Figure 3:
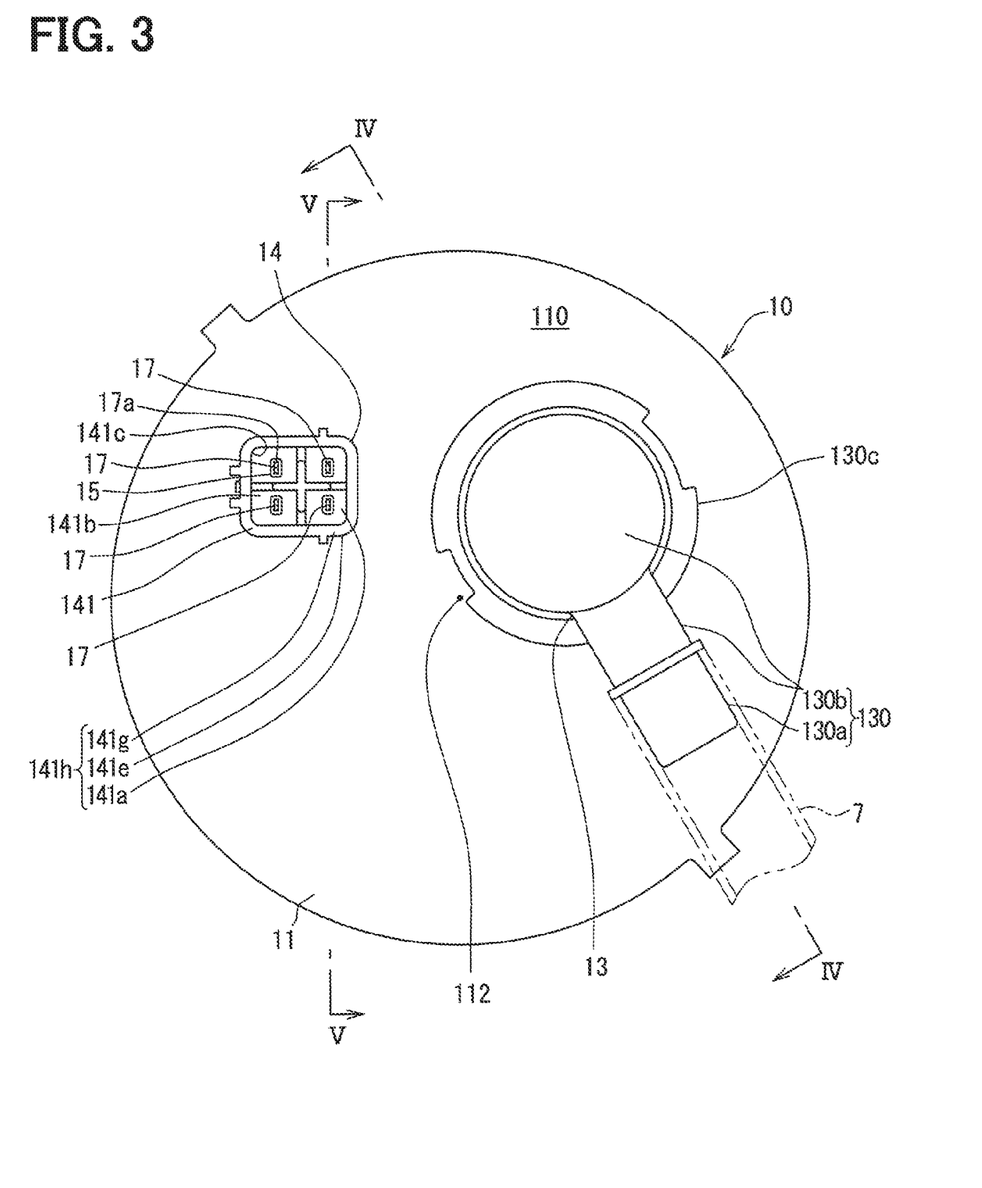
FIG. 3 is a top view showing a tank lid of FIG. 1.
Figure 4:
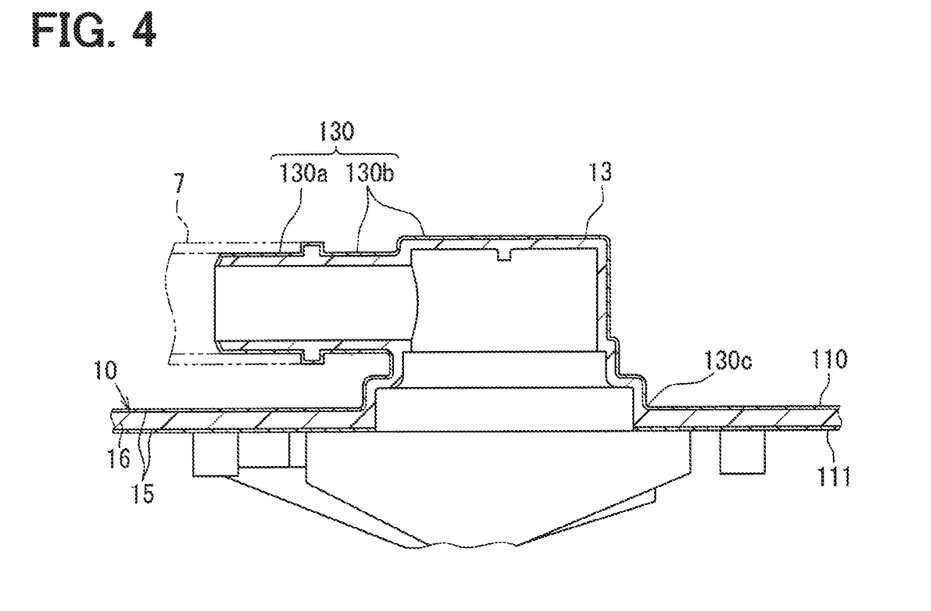
FIG. 4 is a cross-sectional view taken along line IV-IV in FIG. 3.

As shown in FIGS. 1 and 3-5, the fuel supply tube 13 is made of a resin material and is formed integrally with the lid main body 11 in one-piece. The fuel supply tube 13 opens in the inside of the fuel tank 2 located on the lower side the lid back surface 111, so that the fuel supply tube 13 is connected to the fuel filter 43 of the pump unit 40. The fuel supply tube 13 projects in a form of a cylindrical tube from the lid front surface 110 to the outside of the fuel tank 2 and is bent in an L-shape such that the fuel supply tube 13 is connected to the internal combustion engine. Here, as shown in FIGS. 3-5, an outer projection 130 of the fuel supply tube 13, which projects to the outside of the fuel tank 2, is connected to the internal combustion engine through a connecting member 7, which is shaped into a tubular form. Thereby, the connecting member 7 is externally fitted to a distal end side outer peripheral surface 130a of the outer projection 130, and an proximal end side outer peripheral surface 130b of the outer projection 130 is exposed to the outside of the fuel tank 2. Furthermore, the proximal end side outer peripheral surface 130b forms an outer corner portion 130c that is connected to the lid front surface 110 and is shaped into a recessed curved surface form.

As shown in FIGS. 1, 3 and 5, the connector 14 is made of the resin material and is formed integrally with the lid main body 11 in one-piece. The connector 14 is formed at a corresponding location of the lid main body 11, which is displaced from a center portion 112 of the lid main body 11. As shown in FIGS. 3 and 5, a plurality of metal terminals 17 is embedded in the connector 14 by insert resin molding. Each of the metal terminals 17 is also embedded in the lid main body 11 by the insert resin molding, so that the metal terminal 17 extends through the lid main body 11 between the inside and the outside of the fuel tank 2. In order to expose the metal terminals 17 at the inside and the outside of the fuel tank 2 to provide a predetermined electrical connection through the metal terminals 17, the connector 14 includes an outer tubular portion 141 and an inner tubular portion 142.

Figure 6:
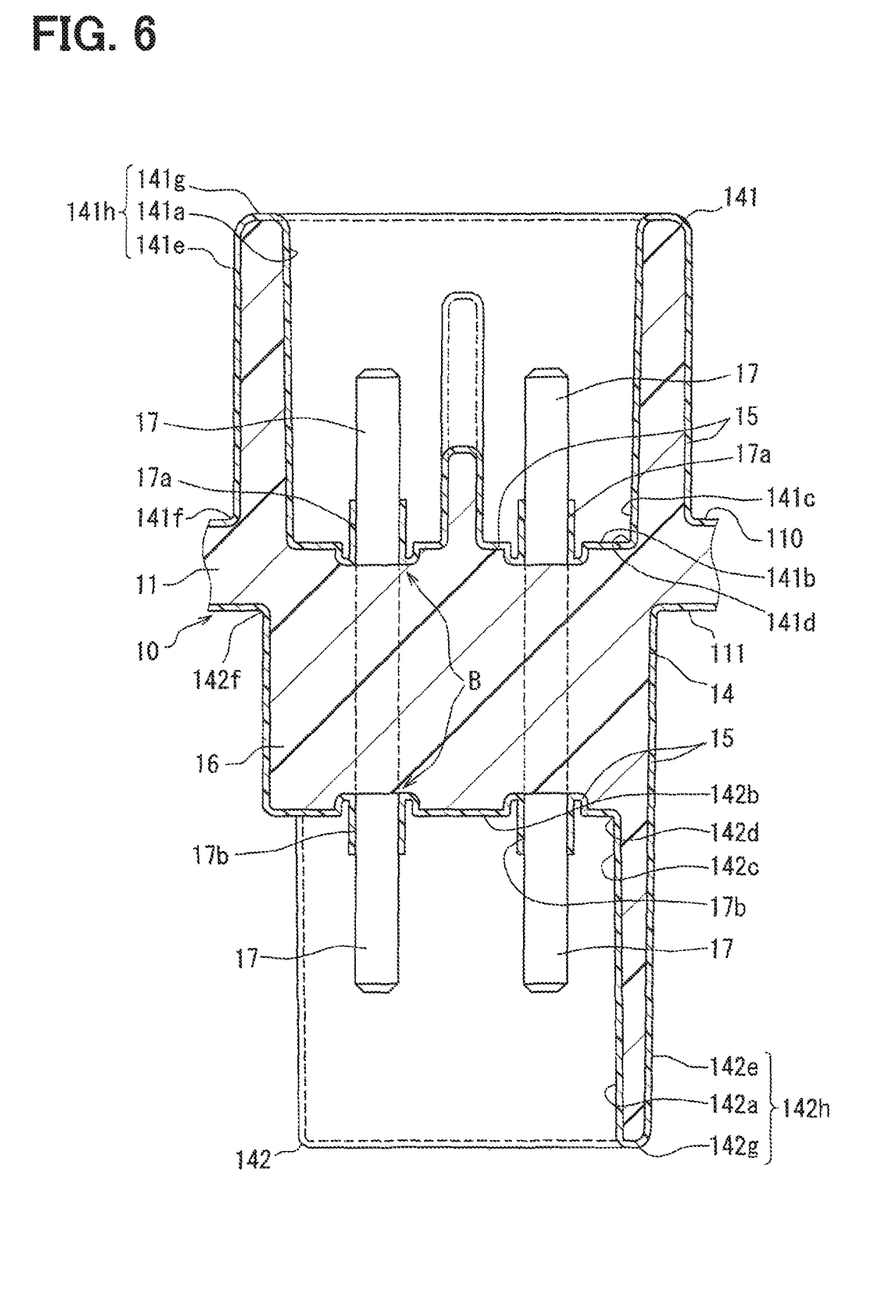
FIG. 6 is an enlarged cross-sectional view of a connector of FIG. 5.

As shown in FIGS. 3, 5 and 6, the outer tubular portion 141 is shaped into a rectangular tubular form and projects from the lid front surface 110 to the outside of the fuel tank 2 located at the upper side of the lid front surface 110. An inner surface 141a of the outer tubular portion 141 is shaped into a bottomed tubular form that opens toward the upper side, so that an inside of the inner surface 141a is exposed to the outside of the fuel tank 2. As shown in FIGS. 3 and 6, at the inner surface 141a, which is shaped into the bottomed tubular form, a bottom surface portion 141b and an inner peripheral surface portion 141c are connected to each other through an inner corner portion 141d that is shaped into a recessed curved surface form. Each of the metal terminals 17 projects from the bottom surface portion 141b of the inner surface 141a into the inside of the outer tubular portion 141. Thereby, the metal terminals 17 are received in the inside of the outer tubular portion 141 such that the metal terminals 17 are spaced from each other, and thereby the metal terminals 17 are surrounded by the inner peripheral surface portion 141c of the inner surface 141a. An outer peripheral surface 141e of the outer tubular portion 141 forms an outer corner portion 141f, which is connected to the lid front surface 110 and is shaped into a recessed curved surface form. The projecting end surface 141g of the outer tubular portion 141 connects between the inner surface 141a and the outer peripheral surface 141e. With the above-described structure, at the outer tubular portion 141, the inner surface 141a, the outer peripheral surface 141e and the projecting end surface 141g are exposed to the outside of the fuel tank 2 to form an outer exposed surface 141h.

As shown in FIGS. 5 and 6, the inner tubular portion 142 is shaped into a rectangular tubular form and projects from the lid back surface 111 to the inside of the fuel tank 2 located on the lower side of the lid back surface 111. An inner surface 142a of the inner tubular portion 142 is shaped into a bottomed tubular form that opens toward the lower side, so that an inside of the inner surface 142a is exposed to the inside of the fuel tank 2. As shown in FIG, 6, at the inner surface 142a, which is shaped into the bottomed tubular form, a bottom surface portion 142b and an inner peripheral surface portion 142c are connected to each other through an inner corner portion 142d that is shaped into a recessed curved surface form. Each of the metal terminals 17 projects from the bottom surface portion 142b of the inner surface 142a into the inside of the inner tubular portion 142. Thereby, the metal terminals 17 are received in the inside of the inner tubular portion 142 such that the metal terminals 17 are spaced from each other, and thereby the metal terminals 17 are surrounded by the inner peripheral surface portion 142c of the inner surface 142a. An outer peripheral surface 142e of the inner tubular portion 142 forms an outer corner portion 142f, which is connected to the lid back surface 111 and is shaped into a recessed curved surface form. The projecting end surface 142g of the inner tubular portion 142 connects between the inner surface 142a and the outer peripheral surface 142e. With the above-described structure, at the inner tubular portion 142, the inner surface 142a, the outer peripheral surface 142e and the projecting end surface 142g are exposed to the inside of the fuel tank 2 to form an inner exposed surface 142h.

As shown in FIG. 1, the sub-tank 20 includes a tank main body 21 and a pump retainer 22. The tank main body 21 is made of a resin material and is shaped into a bottomed cylindrical tubular form. The tank main body 21 is placed in the inside of the fuel tank 2 and is placed on a bottom wall 3b of the tank wall 3. The tank main body 21 stores the fuel, which is transferred from the inside of the fuel tank 2. The pump retainer 22 is made of a resin material and is shaped into a frame form. The pump retainer 22 is installed to the opening portion of the tank main body 21.

The adjusting mechanism 30 includes a support pillar 31 and an urging member 32. The support pillar 31 is made of a metal material and is shaped into a cylindrical tubular form. An upper end of the support pillar 31 is installed to the lid main body 11. The support pillar 31 is supported in a slidable manner in the top-to-bottom direction by the tank main body 21, which is placed on the lower side of the upper end of the support pillar 31. The urging member 32 is made of a metal material and is shaped into a coil spring form. The urging member 32 is coaxially placed around the support pillar 31 and is interposed between the lid main body 11 and the tank main body 21. Thereby, the urging member 32 is placed into a resiliently deformed state, so that the urging member 32 urges a bottom wall 210 of the tank main body 21 toward the bottom wall 3b of the fuel tank 2.

The pump unit 40 includes a suction filter 41, a fuel pump 42, a fuel filter 43, a pressure regulator 44 and a liquid level sensor 45. The suction filter 41 is placed in the inside of the tank main body 21 such that the suction filter 41 is installed on the bottom wall 210. The suction filter 41 is connected to a suction inlet of the fuel pump 42. The suction filter 41 filters the fuel, which is drawn from the inside of the sub-tank 20 toward the fuel pump 42, so that the suction filter 41 removes relatively large foreign objects contained in the fuel.

The fuel pump 42 is placed in the inside of the tank main body 21 such that the fuel pump 42 is positioned above the suction filter 41. The fuel pump 42 is electrically connected to corresponding ones of the metal terminals 17 through a flexible wiring that is flexible. Thereby, when the fuel pump 42 is operated according to a control operation of an external control circuit, the fuel pump 42 discharges the drawn fuel, which is received from the suction filter 41, upon pressurization of the drawn fuel.

The fuel filter 43 extends from the inside of the tank main body 21 to the outside of the tank main body 21 and is positioned around the fuel pump 42. The fuel filter 43 is formed such that a filter element 431, which is, for example, a honeycomb filter material, is received in a filter case 430. The filter case 430 is held by the pump retainer 22. The filter case 430 is connected to a discharge outlet of the fuel pump 42 at an upstream side thereof and is also connected to the fuel supply tube 13 through a flexible tube, which is flexible, at a downstream side thereof. Thereby, the fuel filter 43 filters the fuel, which is discharged from the fuel pump 42 into the inside of the filter case 430 and is conducted toward the fuel supply tube 13, through the filter element 431, so that fine foreign objects contained in the fuel are removed, The fuel, which is filtered in this way, is supplied to the internal combustion engine through the fuel supply tube 13.

The pressure regulator 44 is placed in the inside of the tank main body 21 such that the pressure regulator 44 is positioned on a lateral side of the fuel pump 42. The pressure regulator 44 is connected to a portion of the filter case 430, which forms a fuel path that extends toward the fuel supply tube 13. The pressure regulator 44 adjusts a pressure of the fuel that is discharged from the fuel filter 43 toward the fuel supply tube 13. The liquid level sensor 45 is installed to a peripheral wall portion of the tank main body 21. The liquid level sensor 45 is electrically connected to corresponding ones of the metal terminals 17 through the flexible wiring that is flexible. In this way, the liquid level sensor 45 senses a fuel level in the inside of the fuel tank 2 in response to rotation of an arm 451 that is rotated in response to upward or downward movement of a float 450, which floats on the fuel in the fuel tank 2. At this time, the liquid level sensor 45 outputs a measurement signal of the fuel level to the external control circuit.

(Resin Coating Film)

Next, the tank lid 10 and a resin coating film 15 formed at the tank lid 10 will be described in detail.

As shown in FIGS. 2-6, a lid base material 16 of the tank lid 0, which is a base material placed beneath the resin coating film 15 at the tank lid 10, is made of a resin material, such as polyacetal (POM). At this lid base material 16, the resin coating film 15 is formed at the lid front surface 110; the lid back surface 111; the outer exposed surface 141h including the inner surface 141a; the inner exposed surface 142h including the inner surface 142a; and the outer peripheral surfaces 130a, 130b. Furthermore, as shown in FIGS. 5 and 6, the resin coating film 15 is also formed at an outer peripheral surface 17a of a base side of each metal terminal 17, which projects from the bottom surface portion 141b of the outer tubular portion 141, and also at an outer peripheral surface 17b of a base side of each metal terminal 17, which projects from the bottom surface portion 142b of the inner tubular portion 142.

The resin coating film 15 is formed at the corresponding respective surfaces 110, 111, 141h, 142h, 130a, 130b, 17a, 17b of the tank lid 10 as a thin film, which has a film thickness of, for example, about 0.1 to 20 μm. The resin coating film 15 is formed by dry coating of a resin material, such as polyparaxylylene over the corresponding respective surfaces 110, 111, 141h, 142h, 130a, 130b, 17a, 17b of the lid base material 16 through chemical vapor deposition (CVD). Here, specifically, at the time of forming the resin coating film 15, first of all, a raw material gas is supplied into a chamber, in which the lid base material 16 in the state before the formation of the resin coating film 15 is placed. At this time, while the chamber is kept at the normal temperature of about 10-30 degrees Celsius and the vacuum state of about 0-20 Pa, the gas flow of, for example, polyparaxylylene, which is gasified by plasma gasification upon high frequency discharge, is generated in the chamber. Therefore, the resin coating film 15 is vapor deposited on unmasked portions of the lid base material 16 through a chemical reaction of the resin material, which forms the lid base material 16, with the raw material gas.

The resin coating film 15, which is formed by the plasma CVD in the above described manner, is acid resistant to limit decomposition of molecular chains of, for example, the POM of the lid base material 16 by an acidic liquid. In addition, the resin coating film 15 is dielectric to limit electrical connection to the metal terminals 17, which are made of the metal material, such as brass, and are received in the connector 14. In FIGS. 2 and 4-6, the resin coating film 15 is depicted to have a thickness that is different from the actual relative thickness of the resin coating film 15 relative to the lid base material 16 for the purpose of adding emphasis to the resin coating film 15.

(Advantages)

Now, advantages of the fuel supply device 1 will be described below.

In the tank lid 10 of the fuel supply device 1, the metal terminals 17, which are for the electrical driving and penetrate through the lid main body 11, are surrounded by the bottomed tubular inner surface 141a of the outer tubular portion 141, which projects from the lid front surface 110 of the connector 14 to the outside of the fuel tank 2. The outer exposed surface 141h, which includes the inner surface 141a, of the outer tubular portion 141 exposed at the outside of the fuel tank 2, and the lid front surface 110, are dry coated through the chemical vapor deposition, so that the resin coating film 15 is formed at the side where the outside of the fuel tank 2 is located. The dry coating through the chemical vapor deposition enables the formation of the resin coating film 15 at the high productivity even for the tank lid 10, which includes the connector 14 and has the complicated structure. The dry coating through the chemical vapor deposition can form the resin coating film 15 at the inner corner portion 141d of the inner surface 141a and the outer corner portion 141f of the outer peripheral surface 141e of the outer tubular portion 141 of the connector 14 without having the influence of the surface tension. Accordingly, it is possible to limit the film thickness variations of the resin coating film 15 at the side where the outside of the fuel tank 2 is located. Therefore, it is possible to ensure the acid resistance and the dielectricity of the tank lid 10 that has the connector 14.

Furthermore, the metal terminals 17, which penetrate through the lid main body 11 of the tank lid 10 in the fuel supply device 1, are surrounded by the bottomed tubular inner surface 142a of the inner tubular portion 142 that projects from the lid back surface 111 of the connector 14 toward the inside of the fuel tank 2. The inner exposed surface 142h, which includes the inner surface 142a, of the inner tubular portion 142 exposed at the inside of the fuel tank 2, and the lid back surface 111, are dry coated through the chemical vapor deposition, so that the resin coating film 15 is also formed at the side where inside of the fuel tank 2 is located. The dry coating through the chemical vapor deposition can form the resin coating film 15 at the inner corner portion 142d of the inner surface 142a and the outer corner portion 142f of the outer peripheral surface 142e of the inner tubular portion 142 of the connector 14 without having the influence of the surface tension. Accordingly, it is possible to limit the film thickness variations of the resin coating film 15 even at the side where the inside of the fuel tank 2 is located. Therefore, it is possible to ensure the acid resistance and the dielectricity of the entire tank lid 10 that has the connector 14.

Furthermore, in the fuel supply device 1, the outer peripheral surfaces 17a, 17b of the base sides of each metal terminal 17, which project from the inner surfaces 141a, 142a of the tubular portions 141, 142, and the inner surfaces 141a, 142a are dry coated through the chemical vapor deposition, so that the resin coating film 15 is formed at these surfaces 17a, 17b, 141a, 142a. The resin coating film 15, which is formed in the above-described manner, can limit intrusion of the acidic liquid, which is located at the outside of the fuel tank 2, into a boundary portion B (see FIG. 6) between the inner surface 141a, 142a of each tubular portion 141, 142 and the outer peripheral surface 17a, 17b of the corresponding base side of the metal terminal 17. In this way, it is possible to avoid the decomposition of the material of the connector 14 by the acidic liquid that intrudes into the boundary portion B, and thereby it is possible to ensure the acid resistance of the tank lid 10 that has the connector 14.

Figure 7:
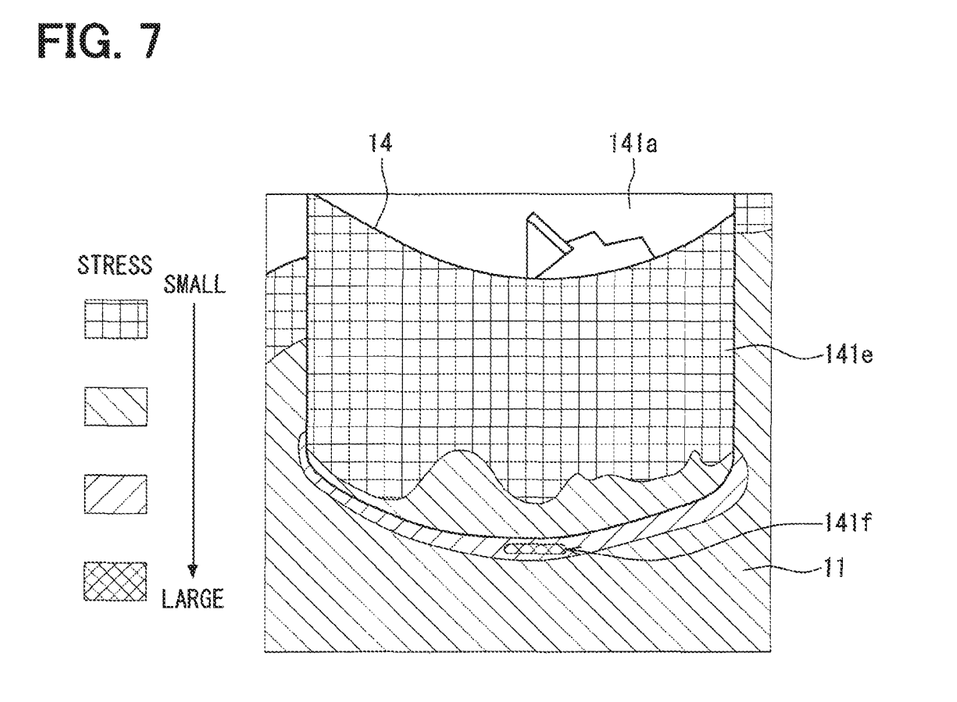
FIG. 7 is a schematic diagram for describing a stress generated at the connector of FIG. 5.

Furthermore, in the fuel supply device 1, the connector 14 is formed at the corresponding location of the lid main body 11, which is displaced from the center portion 112 of the lid main body 11. In this way, the stress, which is intensively generated by the pressure in the inside of the fuel tank 2 at the inner corner portion 141d, 142d of the inner surface 141a, 142a and the outer corner portion 141f, 142f of the outer peripheral surface 141e, 142e at the respective tubular portions 141, 142, as shown in FIG. 7, is minimized. Thus, it is possible to limit the concentration of the stress at the corner portions 141d, 142d, 141f, 142f in the case of the resin coating film 15, which can be thinly formed by the dry coating through the chemical vapor deposition. Thereby, it is possible to limit the deterioration in the acid resistance, which would be caused by a mechanical damage, such as cracking.

In addition, in the fuel supply device 1, the outer peripheral surface 130b of the fuel supply tube 13, which is exposed to the outside of the fuel tank 2, and the lid front surface 110 are dry coated through the chemical vapor deposition, so that the resin coating film 15 is formed at the outer peripheral surface 130b and the lid front surface 110. The dry coating through the chemical vapor deposition can form the resin coating film 15 at the outer corner portion 130c of the outer peripheral surface 130b of the fuel supply tube 13 without having the influence of the surface tension. Accordingly, even at the fuel supply tube 13, which projects from the lid front surface 110 to the outside of the fuel tank 2, it is possible to limit the film thickness variations of the resin coating film 15. Therefore, it is possible to ensure the acid resistance and the dielectricity of the tank lid 10, which has the fuel supply tube 13 in addition to the connector 14.

Furthermore, in the fuel supply device 1, besides the outer peripheral surface 130b of the fuel supply tube 13, which is exposed to the outside of the fuel tank 2, the outer peripheral surface 130a of the fuel supply tube 13, to which the connecting member 7 is externally fitted, and the lid front surface 110 are dry coated through the chemical vapor deposition to form the resin coating film 15 at the outer peripheral surface 130a and the lid front surface 110. In the case where the connecting member 7 is externally fitted to the outer peripheral surface 130a, at which the resin coating film 15 can be thinly formed by the dry coating through the chemical vapor deposition, it is possible to increase the strength of this external fitting of the connecting member 7 to the outer peripheral surface 130a by using the surface roughness of the lid base material 16 that is the base material placed beneath the resin coating film 15.

In addition, in the case where the resin coating film 15 is formed through the chemical vapor deposition under the normal temperature like in the case of the fuel supply device 1, it is possible to limit the deterioration in the acid resistance, which is caused by a thermal damage of the resin coating film 15.

(Other Embodiments)

The embodiment of the present disclosure has been described. However, the present disclosure should not be limited to the above embodiment and may be implemented in various other forms within the scope of the present disclosure.

Specifically, in a first modification, the lid base material 16 of the tank lid 10 may be made of a resin material, which is other than the PQM, or a metal material. In a second modification, the connector 14 may be formed at the center portion 112 of the lid main body 11.

Figure 8:
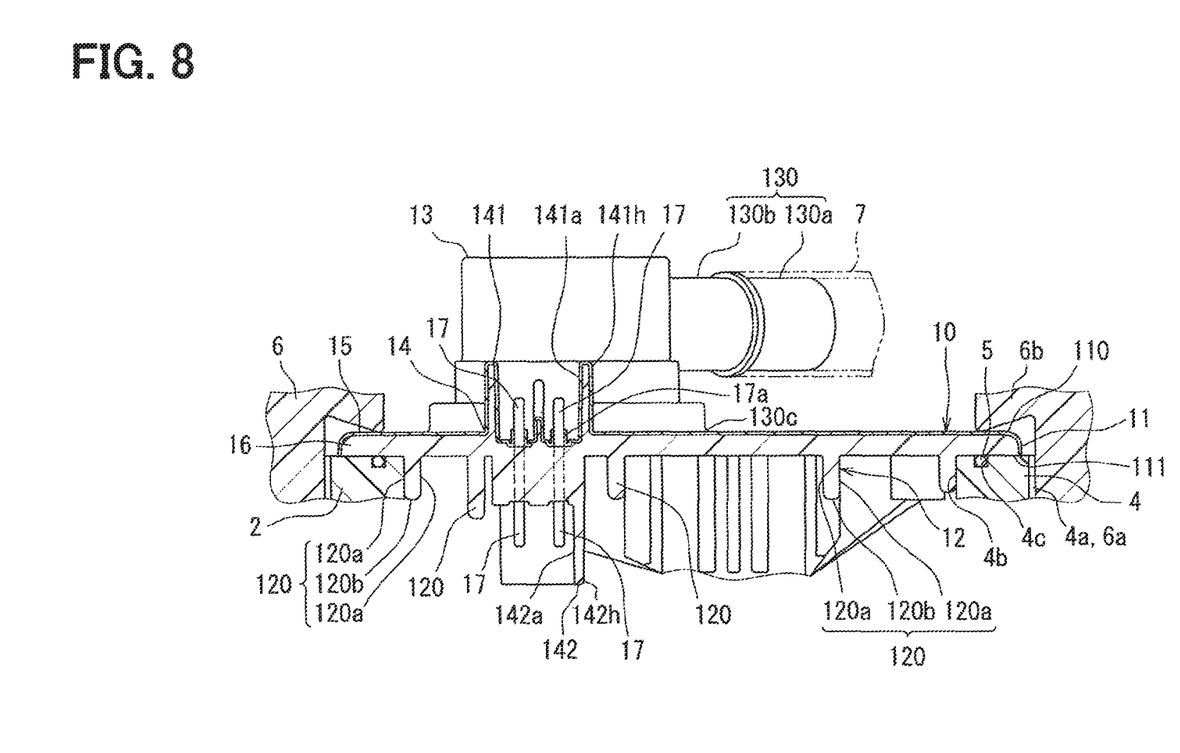
FIG. 8 is a cross-sectional view showing a modification of FIG. 5.
Figure 9:
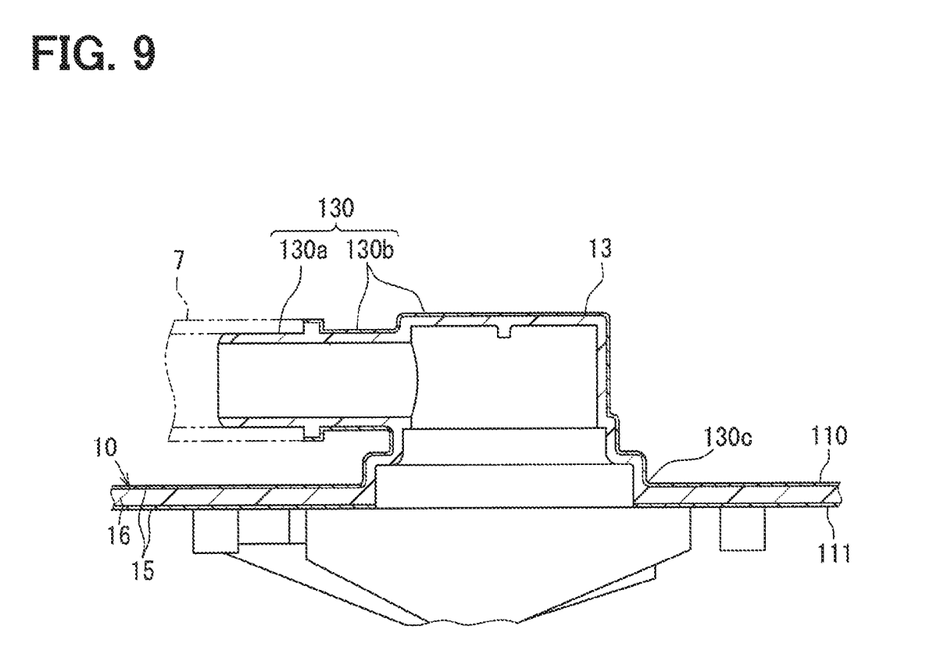
FIG. 9 is a cross-sectional view showing a modification of FIG. 4.
Figure 10:
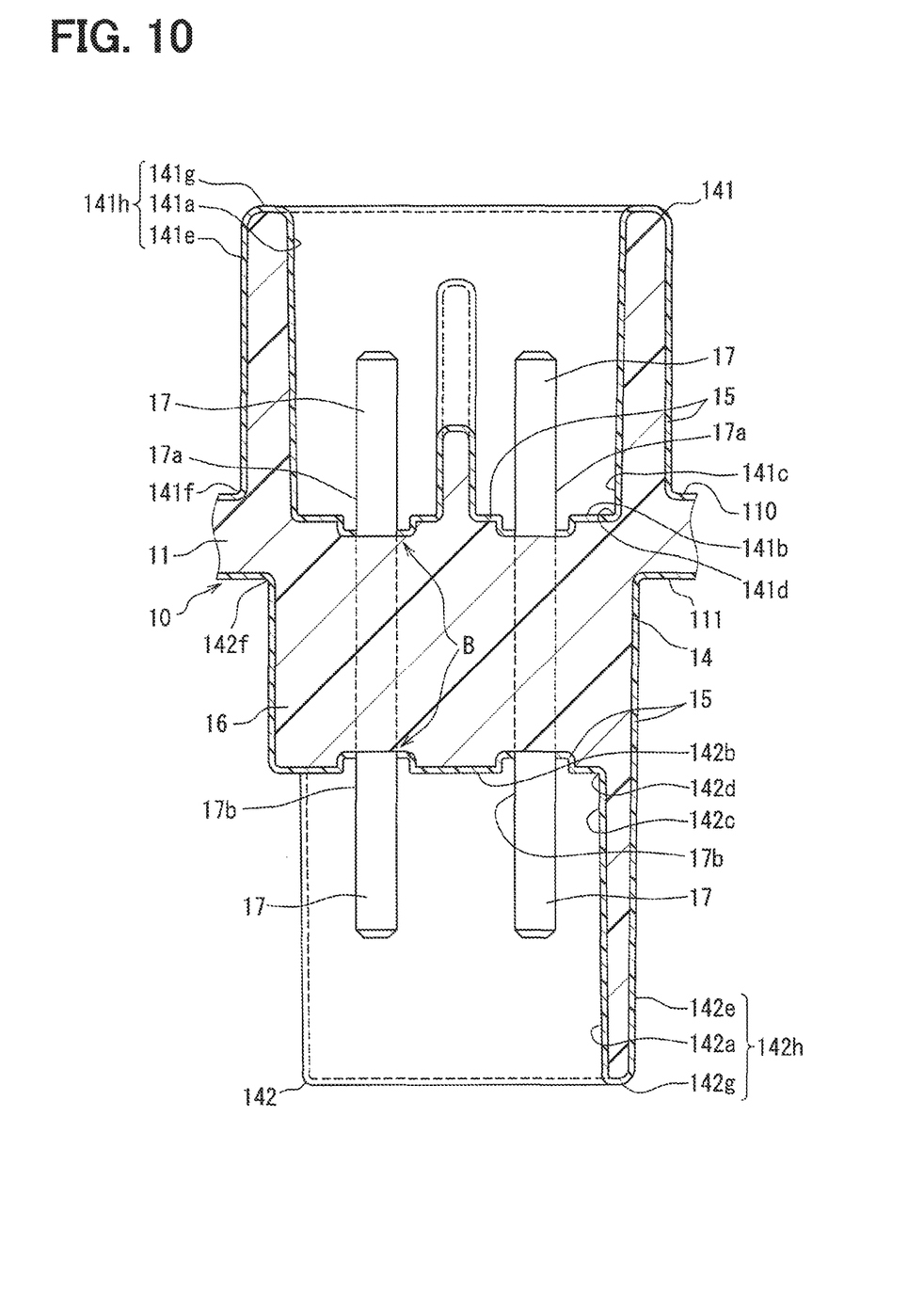
FIG. 10 is a cross-sectional view showing a modification of FIG. 6.

In a third modification, the resin coating film 15 may be formed on at least another surface of the tank lid 10, which is other than the surfaces 110, 141, among the respective surfaces 110, 111, 141h, 142h, 130a, 130b, 17a, 17b of the tank lid 10. Specifically, as exemplary depicted in FIG. 8, the resin coating film 15 may be formed only at the surfaces 110, 141h, 130a, 130b, 17a of the tank lid 10 placed at the side where the outside of the fuel tank 2 is located while the resin coating film 15 may not be formed at the surfaces 111, 142h, 17b of the tank lid 10 placed at the side where the inside of the fuel tank 2 is located. Alternatively, as exemplary depicted in FIG. 9, the resin coating film 15 may be formed only at the outer peripheral surface 130a of the fuel supply tube 13, which is exposed to the outside of the fuel tank 2, while the resin coating film 15 may not be formed at the outer peripheral surface 130a of the fuel supply tube 13, to which the connecting member 7 is externally fitted. Further alternatively, as exemplary depicted in FIG. 10, the resin coating film 15 may not be substantially formed at the outer peripheral surfaces 17a, 17b of the base sides of the metal terminals 17 except the overlapping of the film thickness of the resin coating film 15 at the bottom surface portion 142b.

In a fourth modification, the resin coating film 15 may be formed through the plasma CVD under the higher temperature, which is higher than the normal temperature, or the lower temperature, which is lower than the normal temperature. In a fifth modification, the resin coating film 15 may be formed through the plasma CVD under a higher pressure that is higher than the atmospheric pressure. In a sixth modification, the resin coating film 15 may be formed through another type of chemical vapor deposition, such as thermal CVD or photo-CVD, which is other than the plasma CVD. In a seventh modification, the coating film 15 may be formed by physical vapor deposition (PVD) with, for example, diamond-like carbon (DLC) in place of the chemical vapor deposition.

The invention claimed is:

1. A fuel supply device comprising a tank lid to be fixed to a fuel tank, wherein the fuel supply device is driven through electrical driving of the fuel supply device to supply fuel from an inside of the fuel tank toward an outside of the fuel tank, wherein the tank lid includes:
   a lid main body that covers an opening portion of the fuel tank such that a lid front surface of the lid main body is exposed to the outside of the fuel tank;
   a metal terminal that is for the electrical driving and penetrates through the lid main body between the inside and the outside of the fuel tank;
   a connector that includes an outer tubular portion, which projects from the lid front surface to the outside of the fuel tank, wherein a bottomed tubular inner surface of the outer tubular portion surrounds the metal terminal; and
   a resin coating film that is acid resistant and is dielectric, wherein the resin coating film is formed by dry coating through chemical vapor deposition at:
      an outer exposed surface of the outer tubular portion, which includes the bottomed tubular inner surface of the outer tubular portion as a surface exposed to the outside of the fuel tank;
      the lid front surface; and
      an outer peripheral surface of a base side of the metal terminal, which projects from the bottomed tubular inner surface of the outer tubular portion, wherein the resin coating film continuously extends from the outer peripheral surface of the base side of the metal terminal to the bottomed tubular inner surface of the outer tubular portion.

2. The fuel supply device according to claim 1, wherein:
   the lid main body covers the opening portion such that a lid back surface of the lid main body is exposed in the inside of the fuel tank;
   the connector includes an inner tubular portion, which projects from the lid back surface into the inside of the fuel tank, wherein a bottomed tubular inner surface of the inner tubular portion surrounds the metal terminal; and
   the resin coating film is formed by the dry coating through the chemical vapor deposition at:
      an inner exposed surface of the inner tubular portion, which includes the bottomed tubular inner surface of the inner tubular portion as a surface exposed to the inside of the fuel tank; and
      the lid back surface.

3. The fuel supply device according to claim 2, wherein the resin coating film is formed by the dry coating through the chemical vapor deposition at:
   an outer peripheral surface of a base side of the metal terminal, which projects from the bottomed tubular inner surface of the inner tubular portion; and
   the bottomed tubular inner surface of the inner tubular portion.

4. The fuel supply device according to claim 1, wherein the connector is formed at a portion of the lid main body, which is displaced from a center portion of the lid main body.

5. The fuel supply device according to claim 1, wherein:
   the tank lid further includes a fuel supply tube, which projects from the lid front surface to the outside of the fuel tank to supply the fuel to a fuel supply destination; and
   the resin coating film is formed by the dry coating through the chemical vapor deposition at:
      an outer peripheral surface of the fuel supply tube, which is exposed to the outside of the fuel tank; and
      the lid front surface.

6. The fuel supply device according to claim 5, wherein:
   a connecting member to be connected to the fuel supply destination is externally fitted to the fuel supply tube;
   the resin coating film is formed by the dry coating through the chemical vapor deposition at:
      an outer peripheral surface of the fuel supply tube, which is exposed to the outside of the fuel tank;
      an outer peripheral surface of the fuel supply tube, to which the connecting member is externally fitted; and
      the lid front surface.

7. The fuel supply device according to claim 1, wherein the resin coating film is formed through the chemical vapor deposition at a normal temperature.

* * * * *